(12) United States Patent
Bratina et al.

(10) Patent No.: US 7,776,127 B2
(45) Date of Patent: Aug. 17, 2010

(54) USE OF A CHANNEL INDUCTION FURNACE TO PROCESS AT LEAST ONE OF A MOLTEN METAL PRODUCT, A VAPOR PHASE METAL PRODUCT AND A SLAG PRODUCT FROM A VARIETY OF FEED MATERIALS

(75) Inventors: James E. Bratina, Greenwood, IN (US); Thomas Edward Roberts, Greenwood, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 94 days.

(21) Appl. No.: 12/048,597

(22) Filed: Mar. 14, 2008

(65) Prior Publication Data

US 2009/0229408 A1 Sep. 17, 2009

(51) Int. Cl.
*C22B 4/00* (2006.01)
(52) U.S. Cl. .................. 75/10.46; 75/10.38; 75/10.4; 75/10.14; 75/10.62; 75/10.65; 75/414
(58) Field of Classification Search ..... 75/10.14–10.17; C21B 7/24, 9/16, 11/00; C22C 1/06, 5/46, C22C 5/52, 7/00; G01F 23/284; G01N 22/00
See application file for complete search history.

(56) References Cited

U.S. PATENT DOCUMENTS

| 4,403,327 | A | 9/1983 | Granstrom et al. |
| 4,605,435 | A | 8/1986 | Duyvesteyn |
| 4,612,041 | A | 9/1986 | Matsuoka et al. |
| 4,762,554 | A | 8/1988 | Lazcano-Navarro |
| 4,802,919 | A | 2/1989 | Fey |
| 4,878,944 | A | 11/1989 | Rolle et al. |
| 5,013,532 | A | 5/1991 | Sresty |
| 5,082,493 | A | 1/1992 | Barrett et al. |
| 5,188,658 | A | 2/1993 | Aime et al. |
| 5,249,198 | A | 9/1993 | Matsuoka |
| 5,304,230 | A | 4/1994 | Steins et al. |
| 5,435,835 | A | 7/1995 | Lynn et al. |
| 5,439,505 | A * | 8/1995 | Krofchak ..................... 75/773 |
| 5,493,580 | A | 2/1996 | Fudala |
| 5,538,532 | A | 7/1996 | Keegel, Jr. |
| 5,667,553 | A | 9/1997 | Keegel, Jr. |
| 5,879,617 | A | 3/1999 | Fuchs et al. |
| 5,980,606 | A | 11/1999 | Sarma et al. |
| 5,993,512 | A | 11/1999 | Pargeter et al. |

(Continued)

FOREIGN PATENT DOCUMENTS

JP            7133987 A         5/1995

(Continued)

*Primary Examiner*—Jerry Lorengo
*Assistant Examiner*—Jared Wood
(74) *Attorney, Agent, or Firm*—Brinks Hofer Gilson & Lione

(57) ABSTRACT

A method of operating a channel induction furnace to process a feed material and obtain therefrom at least one of a molten metal product, a vapor phase metal product and a slag product. The method involves the use a variety of feed materials that contribute to the molten metal product and/or the vapor phase metal product and/or the slag product and/or function as a binder for briquetting or pelletizing the feed material.

11 Claims, 4 Drawing Sheets

U.S. PATENT DOCUMENTS

| | | |
|---|---|---|
| 6,102,982 A | 8/2000 | Isozaki et al. |
| 6,120,577 A | 9/2000 | Koros et al. |
| 6,136,059 A | 10/2000 | Zoppi |
| 6,221,124 B1 | 4/2001 | Blom |
| 6,831,939 B2 * | 12/2004 | Bratina et al. ............... 373/7 |
| 2007/0062330 A1 | 3/2007 | Bratina et al. |
| 2007/0157761 A1 | 7/2007 | Bratina |

FOREIGN PATENT DOCUMENTS

| | | | |
|---|---|---|---|
| JP | 2003-021470 A | | 1/2003 |
| KR | 20010010281 | * | 2/2005 |
| WO | WO2006107715 | * | 3/2006 |

* cited by examiner

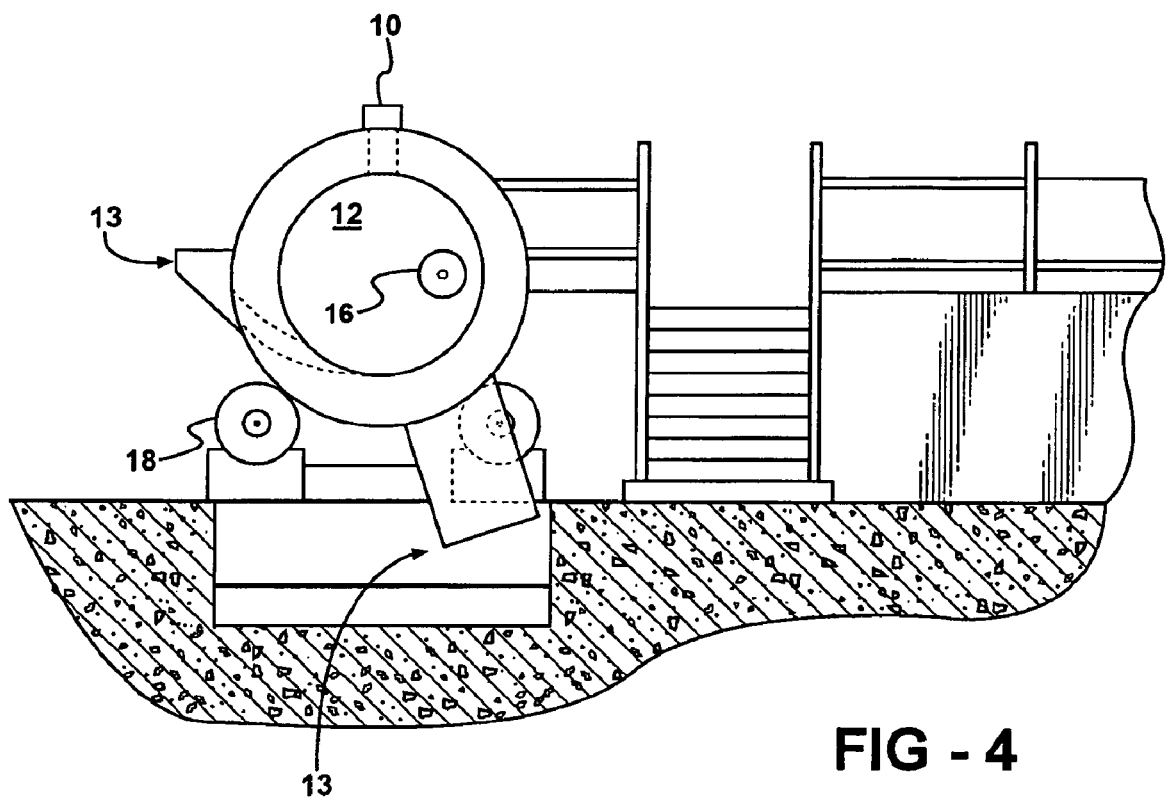
FIG - 4
FIG - 5
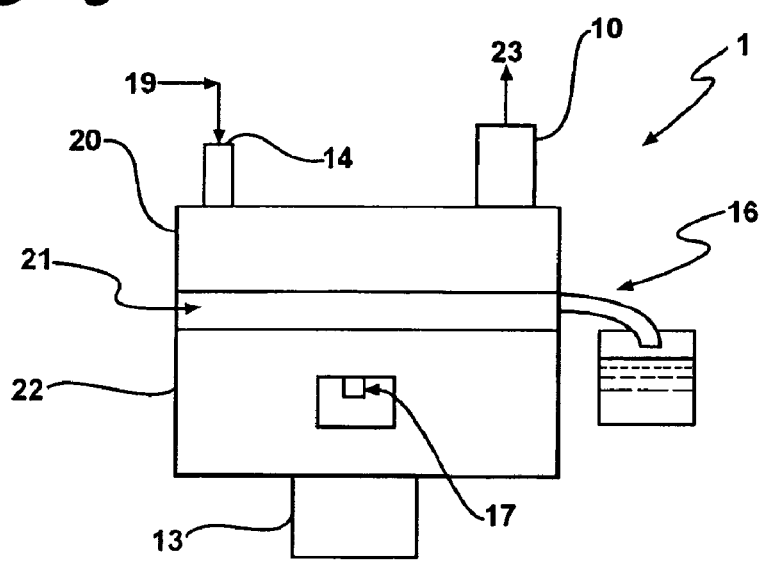

USE OF A CHANNEL INDUCTION FURNACE TO PROCESS AT LEAST ONE OF A MOLTEN METAL PRODUCT, A VAPOR PHASE METAL PRODUCT AND A SLAG PRODUCT FROM A VARIETY OF FEED MATERIALS

TECHNICAL FIELD

The present invention relates to the methods for processing various materials to retain one or more product(s) from such materials. More particularly, the present invention relates to methods and process for processing various materials in an induction furnace to obtain at least one of a metal product, a slag product and a volatile product.

BACKGROUND ART

There are many waste materials that are generated during the production of steel and in other manufacturing processes. During the production of steel, electric arc furnace (EAF) dust and basic oxygen furnace (BOF) dust/sludge are captured and collected for either disposal or recycle.

The major components in these dusts are iron (up to 60 wt. %) and zinc (up to 30 wt. %), usually in the oxide form. In addition, these dusts contain smaller quantities of calcium, magnesium, manganese, chloride, lead, cadmium and other trace elements. The steel industry generates about 30 to 40 pounds of these types of dust for each ton of steel produced in steel making facilities. The estimated generation of these dusts in the United States in 1997 was in excess of one million tons with nearly half of it being disposed in landfills.

EAF dust is a listed hazardous waste (K061) under United States environmental regulations. Under this regulatory program, EAF dust is subject to specific record keeping, handling requirements and processing costs when it is recycled or disposed of BOF sludge/dust is not a listed hazardous waste, but the lack of adequate reuse options results in a large quantity of this material being disposed of in landfills.

Both EAF dust and BOF sludge/dust contain significant quantities of iron that make these materials valuable for use directly in steel making processes as a substitute for other iron containing materials such as scrap steel, hot metal, sinter dust, and other iron oxides present at steel making facilities. In addition, EAF dust also contains significant quantities of zinc which makes it valuable as a feed for zinc manufacturing processes. BOF sludge/dust contains smaller quantities of zinc, but the zinc present can be recovered for reuse as a zinc product.

Present methods for handling EAF dust include processing it in Waelz kilns, rotary hearth furnaces, and flame reactor processes to recover zinc. EAF dust is also subject to stabilization processes followed by landfill disposal. A small quantity of BOF sludge/dust is returned to the BOF steel making process in some locations and some is recycled in other manners, but a large volume is disposed as a waste material in landfills.

Generally, it can be economical to subject EAF dust having a high zinc content to existing zinc recovery procedures, and send EAF dust having a low zinc content to landfills for disposal as a waste. Since hot metal is the only energy source in BOF facilities, only a limited quantity (approximately 20% of the total steel production rate) of scrap and other solid feed materials that require energy for their use in the BOF process can be added to the charge mix. This limits the quantity of BOF sludge/dust that can be returned to the BOF steel making process. As a result some portion of the BOF sludge/dust is usually sent to landfills for disposal.

Other process methods for recovering zinc and/or iron from EAF dust and BOF sludge/dust have been attempted with limited success. Such processes include thermal processes, hydrometallurgical processes or combinations thereof. In most cases, these processes were not successful because they are expensive to build, expensive to operate and/or they cannot be used to process all of the EAF dust and BOF sludge/dust material, so that waste material remains that still must be disposed of in landfills.

In addition, any processes that treat EAF dust are subject to significant environmental regulatory requirements under the Resource Conservation and Recovery Act ("RCRA"). This is due to the fact that current processes have been specifically developed for the sole purpose of processing EAF dust as a hazardous waste. To date, those in the steel industry view EAF dust as a listed hazardous waste, and accordingly logically conclude that using EAF dust as any type of feed or reactant will necessarily result in the formation, generation or preservation of a hazardous material.

Southwick, "Recovery of Iron and Zinc From Steel Mill Wastes," a presentation from a Conference Organized by Gorham/Inertech in Pittsburgh. Pa on May 17-19, 1999 provides a summary of various processes proposed to recover iron and zinc from mill wastes. In addition, U.S. Pat. Nos. 4,605,435, 5,013,532, 5,082,493, 5,435,835, 5,439,505, 5,493,580, 5,538,532, 5,667,553, 5,879,617, 5,993,512, 6,102,982, 6,120,577, and 6,221,124 are directed to various methods and apparatus for processing EAF dust.

U.S. Pat. No. 6,136,059 to Zoppi discloses the use of an induction furnace for the sole purpose of processing EAF dust. That is, the only feed into the induction furnace after providing a "heel" for the required oxidation and reduction reactions is a half charge of cast iron which is not replenished, but rather into which pellets of EAF dust are added together with coal and small amounts of slagging agents. Zoppi mentions that induction furnaces of the prior art are generally only used as a smelting means in secondary steel and non-ferrous metals processing.

U.S. Pat. No. 6,831,939 to Bratina and Fehsenfeld discloses an expansion of the Zoppi patent that involves operating an induction furnace to both produce hot metal and a pig iron product and to process iron and volatile metal containing materials to recover iron value and concentrate metals which are volatile at the operating temperature of the induction furnace. The process relies upon mixing feeding both metal oxides and reduction material into the induction furnace. The efficiency of the process is limited by the induction furnace that is used.

Other patents that discuss the use of induction furnaces in smelting processes that involve steel processing dust include U.S. Pat. Nos. 5,980,606, 5,304,230, 5,249,198, 5,188,658, 4,878,944, 4,802,919, 4,762,554, 4,612,041, and 4,403,327.

U.S. Patent Application Publication No. 2007/0062330 to Bratina et al. is directed to methods and processes of configuring and operating an induction furnace to process waste materials while producing metal products and recovering iron and volatile metals in a manner that is energy efficient and provides improved separation of volatile metals and improved control of slag viscosity. The complete disclosure of U.S. Patent Application Publication No. 2007/0062330 to Bratina et al. is hereby expressly incorporated by reference.

U.S. Patent Application Publication No. 2007/0157761 to Bratina is directed to a method for the production of an iron product from ore containing iron which involves the use of an induction furnace. The complete disclosure of U.S. Patent Application Publication No. 2007/0157761 to Bratina et al. is hereby expressly incorporated by reference.

The present invention is based upon tests that were conducted using a channel induction furnace similar to that disclosed in U.S. Patent Application Publication No. 2007/0062330 to Bratina et al. During the course of such tests a number of new unexpected discoveries were realized. The present invention is directed to the use of an induction furnace to process various waste materials, including metal and non-metal wastes in such a manner so as to produce and/or retain one or more product(s) from such waste materials.

DISCLOSURE OF THE INVENTION

According to various features, characteristics and embodiments of the present invention which will become apparent as the description thereof proceeds, the present invention provides a method of processing at least one of a molten metal product, a vapor phase metal product and a slag product from at least one waste material which involves:

providing a channel induction furnace having a headspace and containing a molten metal bath;

feeding at least one waste material into a channel induction furnace; and allowing the at least one waste material to react in the channel induction furnace to produce at least one of a molten metal product that passes into the molten metal bath, a vapor phase metal product that passes into the headspace of the channel induction furnace and a slag product that floats as a layer on the molten metal bath, wherein the at least one waste material consists of a source of at least one of i) a source of iron alloy and one of a source of slag and volatile metal;

ii) a source of iron and a reductant;

iii) a source of iron and a minor source of slag;

iv) a source of slag conditioner and a reductant; and v) of a binder and a source of volatile metal.

The present invention further provides a method of processing at least one of a molten metal product, a vapor phase metal product and a slag product from at least one waste material which involves:

providing a channel induction furnace having a headspace and containing a molten metal bath;

feeding at least one waste material into a channel induction furnace; and allowing the at least one waste material to react in the channel induction furnace to produce at least one of a molten metal product that passes into the molten metal bath, a vapor phase metal product that passes into the headspace of the channel induction furnace and a slag product that floats as a layer on the molten metal bath, wherein the at least one waste material is formed into one of a briquette and a pellet using a binder selected from the group consisting of waste paint, cola syrup, soft drink syrup and mixtures thereof.

BRIEF DESCRIPTION OF DRAWINGS

The present invention will be described with reference to the attached drawings which are given as non-limiting examples only, in which:

FIG. 4 is a side view of the channel induction furnace of FIG. 2.

FIG. 5 is a schematic drawing of the channel induction furnace of FIGS. 2-4 which is provided to illustrate how the process of the present invention works according to one embodiment.

BEST MODE FOR CARRYING OUT THE INVENTION

Figure 1:
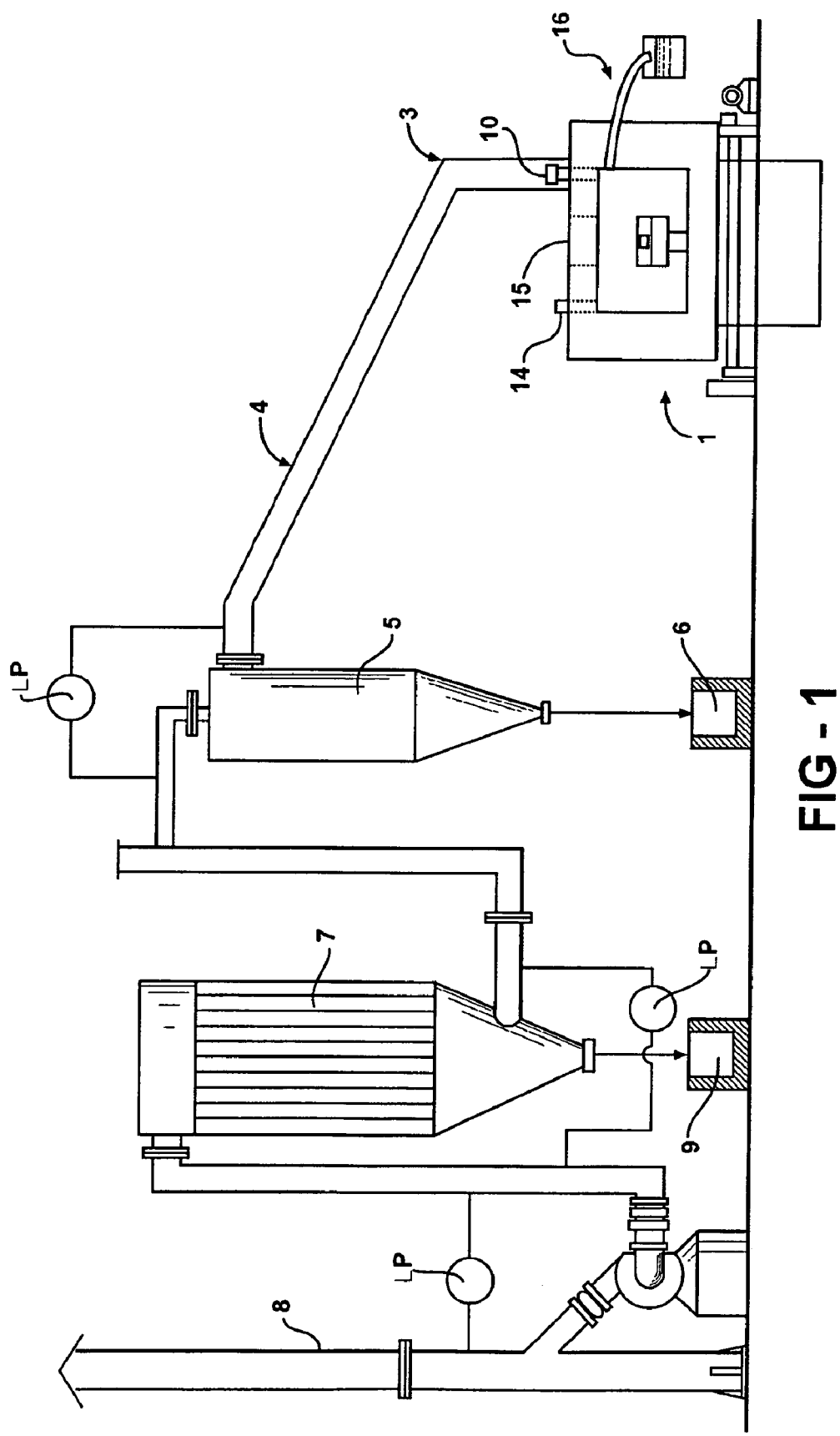
FIG. 1 depicts a prior art system that uses an induction furnace to both produce hot metal (or pig iron) and to recover iron value from iron and volatile metal containing materials, including EAF dust while concentrating volatile metals such as zinc, lead, cadmium, etc.

The present invention is generally directed to methods and apparatus that involve the use of an induction furnace for processing various metal and/or non-metal waste materials while producing one or more products. Reference herein to waste and waste materials is not intended to limit the present invention which is capable of processing a variety of materials that contain various volatile metals, non-volatile metals, and non-metal components, including, ores, scrap materials, stock materials, machining wastes, industrial wastes, etc. The present invention involves a method of configuring and operating an induction furnace for the processing various metal and/or non-metal waste materials and producing one or more products in a manner that is energy efficient and provides improved separation of components from the metal and non-metal waste materials. According to the present invention, the waste materials can be added as various feed streams into the induction furnace. Waste materials that can be processed according to the present invention are exemplified by those listed in Table 1 below.

The configuration of the induction furnace used according to the present invention allows for: 1) controlling the gas temperature in the headspace of the furnace by controlling the flow of excess air into the furnace; 2) controlling the combustion of carbon monoxide in the gas headspace to provide additional heat in the headspace while allowing the gas headspace to remain in a reducing state to prevent volatile metals such as zinc from being oxidized; 3) controlling the chemistry of slag formed in the process with additions of slagging agents (which can be waste materials) to product a fluid slag material that can be easily removed from the furnace and used as a slag conditioner for the steel making industry, an aggregate for forming pavements, a construction article such as pavers or blocks, etc.; 4) providing a feed location at the opposite end of the gas and slag removal locations to allow for a plug flow type reactor that provides an extended reaction time for the process, allowing for more complete separation of the various feed materials in the process; and 5) providing a channel type induction furnace that allows a more energy efficient furnace to be used with thicker refractory sections that both reduce the heat loss from the process and allow for longer periods of operation between the replacement of refractory lining material.

The improved energy and separation efficiency of the present invention serves to provide for a system that will be capable of processing a wide variety of feed materials, including waste materials, in a more cost effective manner than previous processes.

The apparatus used for the present invention includes a channel type induction furnace as its main component that has an inductor at the bottom or other suitable lower portion of the furnace body. This feature allows the furnace to be designed in a more energy efficient manner by incorporating a thicker layer of refractory in the main body (drum portion) of the furnace. This thicker refractor also provides for longer period of time between the need for refractory replacement. While the use of an induction furnace of this type is not unique per se, the use of such an induction furnace for processing various metal and non-metal materials and producing one or more products according to the present invention is unique as evidenced by the specific features and operating methods described herein.

The use of a channel type induction furnace also allows additional improvements to be made in the form of energy efficiency. The body of the furnace is a horizontal drum that can be enclosed to thereby allow the flow of air into the process to be restricted and controlled. The restriction of air flow into the drum limits the quantity of air that is heated in the furnace and removed by the gas control system on the furnace, thus reducing the heat lose to the air that is normal for typical induction furnace operation. The amount of air that enters the furnace can be controlled so as to burn a portion of the carbon monoxide generated by feed materials added into the furnace and/or to combust materials such as organic materials or components. The burning of carbon monoxide in the headspace of the furnace and/or organics can provide additional heat in the gas headspace of the furnace thereby allowing the furnace to operate with a higher temperature in the headspaced than is normal for operation. The high temperature of the gas headspace achieved by the process of the present invention, which can range from about 1,300° C. to about 1,500° C., eliminates or greatly reduces heat loss from the surface of the furnace bath and thereby allows the slag on the surface of the bath to be maintained at a higher temperature.

The flow of air into the furnace can also be controlled as desired to limit the air to a level at which carbon monoxide formed as a result of the metal oxidation reduction process in the system will not be completely oxidized. By keeping excess carbon monoxide in the gas headspace of the furnace the system will be operated in a reducing mode until the gases exit the furnace. When operating in the reducing mode volatile metals released from the feed materials, such as zinc, lead and cadmium (in the vapor form) are prevented from being oxidized in the furnace before they are removed. This manner of operating limits oxidized volatile metals from being deposited in the slag leaving the furnace. As a result, a cleaner slag is maintained during the process.

In addition to maintaining a cleaner slag, the present invention provides for the ability to make a higher quality fluid slag that is easier to remove from the induction furnace process. This is accomplished in at least three ways. First, as discussed above, the air flow into the furnace can be controlled according to the present invention to produce a higher temperature gas headspace. This higher temperature in the gas headspace heats the upper surface of the slag layer. The higher temperature in the gas headspace, which is not provided by typical operation of an induction furnace, prevents and can actually reverse normal loss of heat from the slag surface thereby, in either event, providing a higher temperature for the slag layer. As a result, the fluidity of the slag is increased as compared to the manner in which an induction furnace is typically operated.

According to the present invention, the chemistry of the slag layer can be adjusted to provide a more fluid slag and to provide a slag product that has various uses such as a slag conditioner for the steel making industry, an aggregate for forming pavements, a construction article such as pavers or blocks, etc. This is accomplished by adding silica, lime or some other material or known slagging agent or waste materials to improve the fluidity and quality of the slag.

The induction furnace used according to the present invention is provided with a feed at one end of the furnace and slag/gas removal at the opposite end. This arrangement provides a reaction zone that provides an increase process retention time. This increase in retention time is provided by plug flow movement of the slag on the surface of the iron bath from the feed point to the slag discharge point. The retention time provides more time for volatile metals to react and leave the slag surface before the slag is removed from the furnace. The removed slag therefore has a lower concentration of volatile metals and the proper chemistry for value as an aggregate for road construction applications.

The present invention will be discussed with reference to FIGS. 1-5 in which common reference numerals have been used to identify similar or common elements where possible to avoid having to repeat descriptions of such similar or common elements.

FIG. 1 depicts a prior art system that uses an induction furnace to both produce hot metal (or pig iron) and to recover iron value from iron and volatile metal containing materials, including EAF dust while concentrating volatile metals such as zinc, lead, cadmium, etc. The system depicted in FIG. 1 includes a channel induction furnace 1 inside of which a charge 2 of molten material such as molten iron is depicted as only partially filling the induction furnace 1. The portion or area of charge 2 at and near the upper surface of the charge 2 is relatively calm due to the use of an induction furnace which includes an inductor located at or near the bottom of the furnace through which movement of the molten bath is limited so as not to create turbulent conditions at or near the surface of the charge 2. The portion or area of charge 2 at and near the upper surface of the charge 2 can thus be controlled to flow or move through the induction furnace by adding feed materials through an inlet on one side or end of the furnace and removing slag through an outlet on an opposite side or end of the furnace. This manner of feeding materials into the furnace and removing slag from the furnace allows for a plug flow type reactor that provides an extended reaction time for the process as mentioned above. As shown the channel induction furnace 1 is coupled to a hood 3 through which gases and vapors in the headspace of the channel induction furnace 1 are removed. The hood 3 can be coupled by an air passage 4 to a cyclone 5 in which the coarsest and heaviest components are removed and collected at 6. Complete dust removal takes place in bag house 7 which is upstream of chimney 8. Components removed at bag house 7 are collected at 9.

Figure 2:
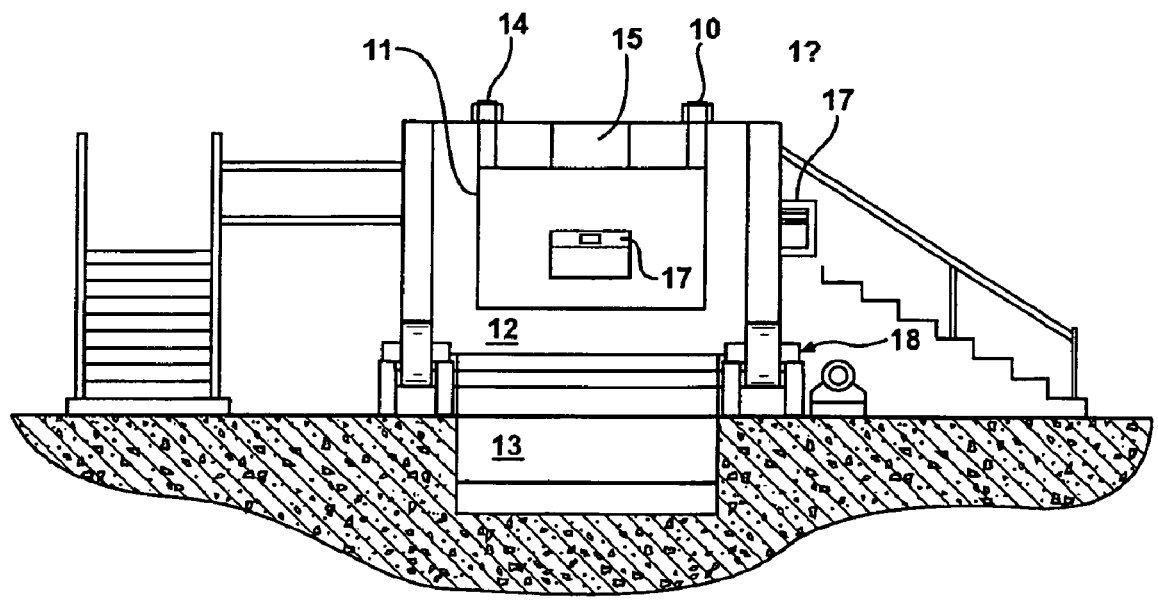
FIG. 2 is a front view of a channel induction furnace used according to one embodiment of the present invention.
Figure 3:
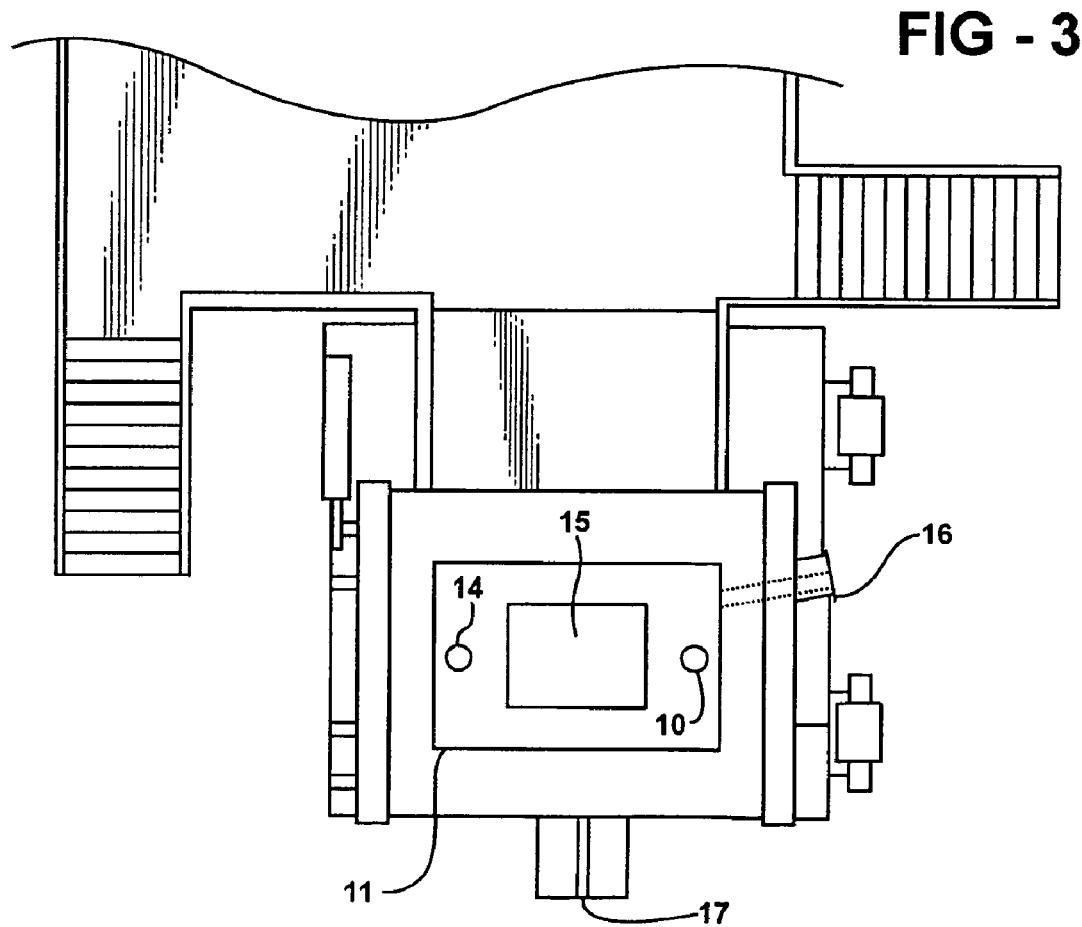
FIG. 3 is a top view of the channel induction furnace of FIG. 2.

FIG. 2 is a front view of a channel induction furnace used according to one embodiment of the present invention. FIG. 3 is a top view of the channel induction furnace of FIG. 3. FIG. 4 is a side view of the channel induction furnace of FIG. 2. The channel induction furnace 1 in FIGS. 2-4 is configured to operate in a continuous fashion to process feed materials while producing various products from materials fed into the furnace. It is also possible to operate the furnace in a batch or semi-continuous batch manner. In addition, the channel induction furnace 1 is configured to remove slag in a continuous manner and is configured to have a gas outlet 10 that can be coupled to a hood 4 shown in FIG. 1. It is also possible to remove the slag in a batch or semi-continuous batch manner.

The channel induction furnace 1 generally includes a drum- or cylindrical-shaped chamber 11 that is surrounded and defined by a refractory material 12 that is provided as a liner. The use and installation of such refractory liners in channel induction furnaces is known as are the refractory materials themselves. An inductor 13 of conventional design is provided at a bottom portion of the drum-shaped chamber 11 and used to maintain the molten bath in the channel induction furnace 1. It is also possible to use the inductor 13 to form an initial molten bath in the channel induction furnace 1; however, it is generally more efficient to form the initial molten bath in some other manner and use the inductor 13 to maintain the molten bath.

At the top of the channel induction furnace 1 an inlet 14 for feeding materials into the channel induction furnace 1 is provided near one side or end and an outlet 10 for removal of gases is provided at an opposite side or end as shown. The channel induction furnace 1 can also be provided with an access port 15 that is generally closed during operation. The access port 15 is shown as being centrally located at the top of the channel induction furnace 1.

A slag discharge 16 is provided at a side or end of the channel induction furnace 1 that is opposite of inlet 14 and at a height that is suitable for controlling a slag layer that forms on a molten bath within the channel induction furnace 1. The slag discharge 16 comprises a trough or channel structure that extends from the side of the channel induction furnace 1 and is in fluid communication with the drum- or cylindrical-shaped chamber 11. The slag discharge 16 can be provided with a gate or movable dam that can be used to control slag discharge.

The channel induction furnace 1 is also provided with a spout 17 in the front of the furnace 1 through which molten metal from the molten bath can be removed from the drum- or cylindrical-shaped chamber 11. In this regard, the channel induction furnace 1 is provided with a mechanism generally identified by reference number 18 which is used to rotate the drum- or cylindrical-shaped chamber 11 about its central axis in a known manner so that molten metal in the molten bath can flow out through the spout 17.

FIG. 5 is a schematic drawing of the channel induction furnace of FIGS. 2-4 which is provided to illustrate how the process of the present invention works according to one embodiment. As shown, the inductor 13 is located at the bottom of the channel induction furnace 1 where it is in communication with the drum- or cylindrical-shaped chamber 11 discussed above. A feed stream 19 enters the channel induction furnace 1 through inlet 14 provided in the top of the furnace 1 near one side or end. Slag conditioning material such as silica, lime, etc. can also be added to the process through inlet 14 which is at the opposite side or end of the drum- or cylindrical-shaped chamber 11 than the slag discharge 16. As the feed materials enter the channel induction furnace through inlet 14 it falls through the gas headspace 20 onto the surface of the slag layer 21. The temperature of the feed materials increases due to the operating temperatures of the channel induction furnace and contact and exposure to the hot slag, heated gas headspace and molten charge.

Metals and metal components that have a high density pass through the slag layer 21 and into the underlying molten bath 22 in the bottom portion of the channel induction furnace 1. The inductor 13 provides energy for the molten metal bath 22 from electrical power to keep the bath 22 at a desired operating temperature. The molten material of the bath 22 is removed from the channel induction furnace 1 through a spout 17 at the front of the furnace 1.

Slag, which has a lower density than the liquid molten bath material will float on the surface of the molten bath 22 and flow toward the slag discharge 16 at the opposite side or end of the channel induction furnace 1 from the inlet 14. The slag will be kept fluid by a combination of high temperature in the gas headspace 20 and slag conditioning additives that improve the slag viscosity as discussed above. The slag can be removed continuously or semi-continuously as desired by the system operation. The travel time from the addition of new feed material to the discharge of its slag components can be adjusted by changing the depth or thickness of the slag layer 16 in the channel induction furnace 1 or changing the surface area of the liquid levels in the furnace through equipment design changes.

Gases produced from the process will be a combination of carbon monoxide, carbon dioxide, volatile metal vapors and combustion products of organic materials, depending on what types of materials are fed into the system. Some air can be added to the system with the feed material stream inlet 14 and at the slag discharge 16. The oxygen in this added air can burn a portion of the carbon monoxide within the gas headspace 20 to add additional heat to the gas headspace 20 area. If too much air is added or allowed to enter at these or other points, all of the carbon monoxide present in the gas headspace 20 can be burnt followed by the burning or oxidation of a portion of any metal vapors. If such metal vapors are allowed to burn or oxidize they will form metal oxides that could condense in the channel induction furnace 1 and into the slag layer 21. This undesired burning or oxidation of metal vapors would result in a lower percentage of volatile metal recovery and an increase in unwanted materials in the slag layer.

The present invention according involves operating the system with control of the air entering the furnace in order to provide the proper gas headspace 20 operating temperature and limit oxygen entering the gas headspace 20. The gas stream 23 exiting the channel induction furnace 1 can be reacted with air as it leaves the furnace 1 to oxidize any volatile metals so that they can be collected in the manner taught by U.S. Pat. No. 6,136,059 to Zoppi and U.S. Pat. No. 6,831,939 to Bratina and Fehsenfeld. These collected volatile metal materials can be subsequently processed to recover the volatile metals according to conventional processes.

In operation, the slag layer 21 can be removed and consequently reduced in thickness until the surface of the underlying molten metal bath 22 approaches the height of the slag discharge 16, before which the drum- or cylindrical-shaped chamber 11 can be rotated about its central axis so that molten metal in the bath 22 can flow out through the spout 17.

The following Table 1 is a non-exhaustive list of various materials that can be fed into the system according to the present invention.

TABLE 1

| Feed Material | Iron | Slag | Volatile Metal (Zn) | Reductant | Binder |
|---|---|---|---|---|---|
| EAF Dust (from carbon steel) | Yes | Yes | Yes | | |
| EAF Dust (from stainless steel) | Alloy | Yes | | | |
| Stainless Steel Sludges | Alloy | Yes | | | |
| BOF Sludge | Yes | Yes | Yes | | |
| AOD Dust | Yes | Yes | Yes | | |
| Blast Furnace Sludge | Yes | | | Yes | |
| Mill Scale | Yes | Minor | | | |
| Waste Iron Oxides | Yes | Minor | | Yes | |
| Iron/Steel Borings | Yes | | | | |
| Iron/Steel Stampings | Yes | | | Yes | |
| Kish Fines | Yes | | | Yes | |
| Iron Carbonate | Yes | | | Yes | |
| Batteries* | Yes | | Yes | | |
| Spent Catalysts | Alloy | | Yes | | |
| Lead Smelter Slag | | | Yes | | |
| Zinc Plating Wastes | | | Yes | | |
| Zinc Hydroxide Sludge/Wastes | | | Yes | | |

TABLE 1-continued

| Feed Material | Iron | Slag | Volatile Metal (Zn) | Reductant | Binder |
|---|---|---|---|---|---|
| Galvanizing Sludges | | | Yes | | |
| Suction Dust from Rubber Mfg. | | | | | |
| Electrofinishing Wastes | Alloy | | | | |
| Silica Carbide | | Cond. | | Yes | |
| Cola/Soft Drink Syrups | | | | | Yes |
| Waste Paints | | | Yes | | Yes |
| Glass Cullet | | Cond. | | | |
| Waste Sand | | Cond. | | | |
| Silica/Silicon Wastes** | | Cond. | | Yes | |

*Batteries include: NiCd, Alkaline, Lithium Ion, Zn/Fe.
**Silica/Silicon Wastes include: Silicon Tubing, Silicon Products, Siloxanes, Silanes.

In Table 1 is a non-exhaustive list of various materials, many of which are considered waste materials from the standpoint that prior to the present invention it was either not believed that any useful product(s) could be obtained from these materials or there was no efficient process for recovering products from these materials. The overall concept of the present invention is to use a waste material as a feed stream and produce therefrom at least one and preferably two or more useful products. These products can be recovered from the channel induction furnace as a released vapor that is subsequently collected and/or a slag product and/or a molten product that is obtained from the molten bath in the channel induction furnace.

Figure 6:
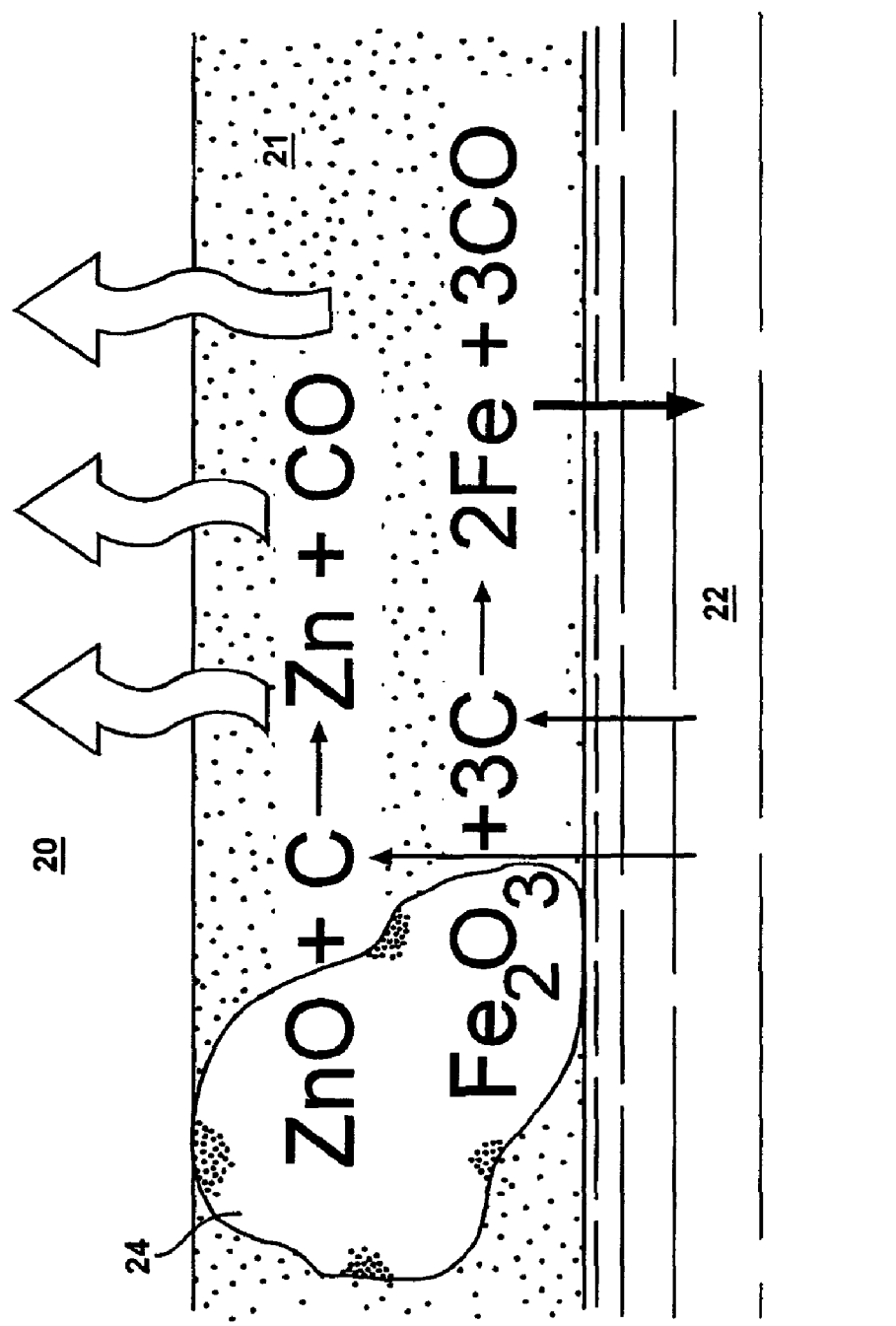
FIG. 6 is a schematic illustration of how feed materials react in the channel induction furnace according to the present invention

FIG. 6 is a schematic illustration of how feed materials react in the channel induction furnace. In FIG. 6 a mass of feed material identified by reference numeral 24 represents a briquette, or pelletized or accumulated volume or mass of loose feed material that contains volatile metal oxides and non-volatile metal oxides. As depicted, the mass of feed material 24 floats on or in slag layer 21 so that a significant portion of the surface area of the mass of feed material 22 is exposed to the slag in the slag layer 21. In FIG. 6 the volatile metal oxides in the feed material are represented by zinc oxide (ZnO), it being understood that other volatile metals could be included such as cadmium, lead, and other metals that will enter the vapor phase at the operating conditions of the channel induction furnace. The non-volatile metal oxides are represented by iron oxide ($Fe_2O_3$), it being understood that the feed materials could contain other non-volatile metal oxides which can be reduced into elemental metals which are in the liquid phase at the operating conditions of the channel induction furnace. It is further noted that the feed materials typically contain other components which produce the slag and can include for example non-metallic components and compounds such as calcium silicates, silica, alumina, calcia, magnesium, etc. For simplicity, these material components that form the slag are not shown in FIG. 6.

The molten bath 22 contains carbon as a reductant. The carbon in the molten bath 22 reacts both with the volatile metal oxides in the feed materials and reacts with the non-volatile metal oxides in the feed materials. In the exemplary case of zinc oxide, the zinc oxide reacts with carbon from the molten bath 22 as follows:

$$ZnO+C \rightarrow Zn+CO$$

As indicated by the arrows in FIG. 7, the elemental zinc (Zn) produced by the carbon reduction of zinc oxide forms in the vapor phase and passes through or leaves the slag layer 21 and enters the headspace 20 of the channel induction furnace for collection and processing as discussed herein. The carbon monoxide forms as a gas and passes through or leaves the slag layer 21 and enters the headspace 20 of the channel induction furnace.

In the exemplary case of iron oxide ($Fe_2O_3$), the iron oxide reacts with carbon from the molten bath 22 as follow:

$$Fe_2O_3+3C \rightarrow 2Fe+3CO$$

As indicated by the arrows in FIG. 7, the elemental iron (Fe) produced by the carbon reduction of iron oxide forms in the liquid phase and passes through or leaves the slag layer 21 and enters the molten bath 22 beneath the slag layer 21. The carbon monoxide forms as a gas and passes through or leaves the slag layer 21 and enters the headspace 20 of the channel induction furnace.

From FIG. 6 it can be appreciated how the reaction zone for each mass of feed material is located substantially in the slag layer. As the reaction proceeds, the discrete masses or volumes of the feed materials break up and/or dissolve so that by the time they flow from the inlet 8 of the channel induction furnace to the slag discharge 16 with the moving slag layer they are completely reacted and converted into elemental volatile metals that leave through the headspace 20 via vapor phase and/or elemental non-volatile metals that enter the molten bath in the liquid phase and/or non-metallic components that become part of the slag layer. The reaction or residence time of the discrete masses or volumes of the feed materials through the channel induction furnace 1 can accordingly be controlled by removal of the slag through the slag discharge. As discussed elsewhere herein, and not illustrated in FIG. 6, the chemistry and fluidity of the slag layer can be controlled as desired by adding appropriate agents to the slag and carbon, which is depleted from the molten bath as the reactions proceed, can be replenished by adding reductants together with the feed materials or otherwise into the molten bath independently of the feed materials.

In addition to feed materials which provide a source of iron, which is recovered from the molten bath as a iron product, e.g. pig iron, as listed in Table 1 other feed materials can provide a source of iron alloy and either a source of slag or a source of a volatile metal such as zinc. These feed materials include EAF dust from stainless steel processes, stainless steel sludges, and spent catalysts.

Other feed materials provide a source of iron, a source of slag and a source of volatile metals such as zinc. These feed materials include EAF dust from carbon steel processes, BOF dust and AOD dust.

Other feed materials can provide both a source of iron and a reductant. These feed materials include blast furnace dust, iron and/or steel borings, iron and/or steel stampings, kish fines, and iron carbonate.

Other feed materials provide a source of iron and a minor source of slag. These feed materials include mill scale and waste iron oxides.

Other feed materials provide a conditioner for the slag and a reductant. These feed materials include silica carbide, silica wastes and silicon wastes. Waste paints and cola/soft drink syrups are examples of feed materials that function as binders for briquettes or pellets with waste paints exemplifying feed materials that also provide a source of volatile metals such as zinc.

The feed materials exemplified in Table 1 can be used separately or in combination. The Feed materials can be subjected to a briquetting or pelletizing process or fed in as a loose material. The feed materials can also be pre-heated if desired. Due to the extreme operating temperature of the induction furnace, the feed materials can contain moisture and/or organic components, including oily components. Such moisture and organic components will quickly vaporize as the feed materials enter the induction furnace. Further, any organics exiting the induction furnace will be oxidized with carbon monoxide and volatile materials (e.g. zinc).

The feed materials can include waste materials that are considered as hazardous wastes, including those which are classified as hazardous wastes under RCRA. In such cases these waste materials will not be subject to RCRA regulations due to the fact that they are being used as feedstocks according to the present invention to produce commercial products.

The process of the present invention can be preformed at the site where waste materials are produced by installing and operating a channel induction furnace as described herein. Otherwise, waste products can be transported from a site where the waste materials are produced to a separate facility that operates a channel induction furnace as described herein.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above or from the scope of the attached claims.

What is claimed is:

1. A method of continuously processing at least one of a molten metal product, a vapor phase metal product and a slag product from at least one waste material which comprises:
   providing a furnace having a headspace, opposite ends and containing a molten metal bath;
   operating the furnace so that the surface of the molten metal bath is not under turbulent conditions;
   forming and maintaining a slag layer on the molten metal bath;
   feeding at least one waste material into the furnace at one of the opposite ends and into the slag layer that floats on the molten metal bath so that the at least one waste material is engulfed by the slag layer;
   allowing the at least one waste material to react in the furnace to replenish the slag layer that floats on the molten metal bath and produce at least one of a molten metal product that passes into the molten metal bath, and a vapor phase metal product that passes into the headspace of the furnace;
   removing a portion of the slag layer as a slag product from another of the opposite ends of the furnace so as to cause the slag layer and the at least one waste material fed into the slag layer to move across the surface of the molten metal bath; and
   continuously maintaining the thickness of the slag layer at a level so that the thickness is sufficient to support the at least one waste material in the slag layer.

2. A method of continuously processing at least one of a molten metal product, a vapor phase metal product and a slag product from at least one waste material according to claim 1, wherein the at least one waste material is selected from the group consisting of EAF dust from a stainless steel process, stainless steel sludge, spent catalysis and mixtures thereof.

3. A method of continuously processing at least one of a molten metal product, a vapor phase metal product and a slag product from at least one waste material which comprises:
   providing a furnace having a headspace, opposite ends and containing a molten metal bath;
   operating the furnace so that the surface of the molten metal bath is not under turbulent conditions;
   forming and maintaining a slag layer on the molten metal bath;
   feeding at least one waste material into the furnace at one of the opposite ends and into the slag layer that floats on the molten metal bath so that the at least one waste material is engulfed by the slag layer; and
   allowing the at least one waste material to react in the furnace to replenish the slag layer that floats on the molten metal bath and to produce at least one of a molten metal product that passes into the molten metal bath, and a vapor phase metal product that passes into the headspace of the furnace;
   removing a portion the slag layer as a slag product from another of the opposite ends of the furnace so as to cause the slag layer and the at least one waste material fed into the slag layer to move across the surface of the molten metal bath; and
   continuously maintaining the thickness of the slag layer at a level so that the thickness is sufficient to support the at least one waste material in the slag layer,
   wherein the at least one waste material comprises of a source of iron and a reductant.

4. A method of continuously processing at least one of a molten metal product, a vapor phase metal product and a slag product from at least one waste material according to claim 3, wherein the at least one waste material is selected from the group consisting of blast furnace dusts, iron borings, steel borings, iron stampings, steel stampings, kish fines, iron carbonate and mixtures thereof.

5. A method of continuously processing at least one of a molten metal product, a vapor phase metal product and a slag product from at least one waste material according to claim 3, wherein the at least one waste material is selected from the group consisting of mill scale, waste iron oxides and mixtures thereof.

6. A method of continuously processing at least one of a molten metal product, a vapor phase metal product and a slag product from at least one waste material according to claim 3, wherein the at least one waste material is selected from the group consisting of silica carbide, silica wastes, silicon wastes and mixtures thereof.

7. A method of continuously processing at least one of a molten metal product, a vapor phase metal product and a slag product from at least one waste material which comprises:
   providing a furnace having a headspace, opposite ends and containing a molten metal bath;
   operating the furnace so that the surface of the molten metal bath is not under turbulent conditions;
   forming and maintaining a slag layer on the molten metal bath;
   feeding at least one waste material into the furnace at one of the opposite ends and into the slag layer that floats on the molten metal bath so that the at least one waste material is engulfed by the slag layer;
   allowing the at least one waste material to react in the furnace to replenish the slag layer that floats on the molten metal bath and produce at least one of a molten metal product that passes into the molten metal bath, and a vapor phase metal product that passes into the headspace of the furnace;
   removing a portion the slag layer as a slag product from another of the opposite ends of the furnace so as to cause the slag layer and the at least one waste material fed into the slag layer to move across the surface of the molten metal bath; and
   continuously maintaining the thickness of the slag layer at a level so that the thickness is sufficient to support the at least one waste material in the slag layer, wherein the at least one waste material comprises of a source of iron and a minor source of slag.

8. A method of continuously processing at least one of a molten metal product, a vapor phase metal product and a slag product from at least one waste material which comprises:

providing a furnace having a headspace, opposite ends and containing a molten metal bath;

operating the furnace so that the surface of the molten metal bath is not under turbulent conditions;

forming and maintaining a slag layer on the molten metal bath;

feeding at least one waste material into the furnace at one of the opposite ends and into the slag layer that floats on the molten metal bath so that the at least one waste material is engulfed by the slag layer;

allowing the at least one waste material to react in the furnace to replenish the slag layer that floats on the molten metal bath and produce at least one of a molten metal product that passes into the molten metal bath, and a vapor phase metal product that passes into the headspace of the furnace;

removing a portion the slag layer as a slag product from another of the opposite ends of the furnace so as to cause the slag layer and the at least one waste material fed into the slag layer to move across the surface of the molten metal bath; and continuously maintaining the thickness of the slag layer at a level so that the thickness is sufficient to support the at least one waste material in the slag layer, wherein the at least one waste material comprises of a source of slag conditioner and a reductant.

9. A method of continuously processing at least one of a molten metal product, a vapor phase metal product and a slag product from at least one waste material which comprises:

providing a furnace having a headspace, opposite ends and containing a molten metal bath;

operating the furnace so that the surface of the molten metal bath is not under turbulent conditions;

forming and maintaining a slag layer on the molten metal bath;

feeding at least one waste material into the furnace at one of the opposite ends and into the slag layer that floats on the molten metal bath so that the at least one waste material is engulfed by the slag layer;

allowing the at least one waste material to react in the channel induction furnace to replenish the slag layer that floats on the molten metal bath and produce at least one of a molten metal product that passes into the molten metal bath, and a vapor phase metal product that passes into the headspace of the furnace, removing a portion of the slag layer as a slag product from another of the opposite ends of the furnace so as to cause the slag layer and the at least one waste material fed into the slag layer to move across the surface of the molten metal bath; and continuously maintaining the thickness of the slag layer at a level so that the thickness is sufficient to support the at least one waste material in the slag layer, wherein the at least one waste material comprises of a binder and a source of volatile metal.

10. A method of continuously processing at least one of a molten metal product, a vapor phase metal product and a slag product from at least one waste material according to claim 9, wherein the at least one waste material is waste paint.

11. A method of continuously processing at least one of a molten metal product, a vapor phase metal product and a slag product from at least one waste material which comprises:

providing a furnace having a headspace, opposite ends and containing a molten metal bath;

operating the furnace so that the surface of the molten metal bath is not under turbulent conditions;

forming and maintaining a slag layer on the molten metal bath;

feeding at least one waste material into furnace at one of the opposite ends and into the slag layer that floats on the molten metal bath so that the at least one waste material is engulfed by the slag layer;

allowing the at least one waste material to react in the furnace to replenish the slag layer that floats on the molten metal bath and produce at least one of a molten metal product that passes into the molten metal bath, and a vapor phase metal product that passes into the headspace of the furnace;

removing a portion slag layer as a slag product from another of the opposite ends of the furnace so as to cause the slag layer and the at least one waste material fed into the slag layer to move across the surface of the molten metal bath; and continuously maintaining the thickness of the slag layer at a level so that the thickness is sufficient to support the at least one waste material in the slag layer, wherein the at least one waste material is formed into one of a briquette and a pellet using a binder selected from the group consisting of waste paint, cola syrup, soft drink syrup and mixtures thereof.

* * * * *

UNITED STATES PATENT AND TRADEMARK OFFICE
CERTIFICATE OF CORRECTION

| | | |
|---|---|---|
| PATENT NO. | : 7,776,127 B2 | Page 1 of 1 |
| APPLICATION NO. | : 12/048597 | |
| DATED | : August 17, 2010 | |
| INVENTOR(S) | : James E. Bratina and Thomas Edward Roberts | |

It is certified that error appears in the above-identified patent and that said Letters Patent is hereby corrected as shown below:

Column 9, line 63 should be changed from
"As indicated by the arrows in FIG. 7, the elemental zinc"
to
--As indicated by the arrows in FIG. 6, the elemental zinc--

Column 10, line 8 should be changed from
"As indicated by the arrows in FIG. 7, the elemental iron"
to
--As indicated by the arrows in FIG. 6, the elemental iron--

Column 10, line 19 should be changed from
"the time they flow from the inlet 8 of the channel induction"
to
--the time they flow from the inlet 14 of the channel induction--

Signed and Sealed this
Ninth Day of August, 2011

David J. Kappos
*Director of the United States Patent and Trademark Office*